United States Patent [19]

Koppehele

[11] 4,170,761

[45] Oct. 9, 1979

[54] REMOTELY POWERED INTERMEDIATE AMPLIFIER FOR COMMUNICATIONS TRANSMISSION

[75] Inventor: Frithjof Koppehele, Munich, Fed. Rep. of Germany

[73] Assignee: Siemens Aktiengesellschaft, Berlin & Munich, Fed. Rep. of Germany

[21] Appl. No.: 884,583

[22] Filed: Mar. 8, 1978

[30] Foreign Application Priority Data

Mar. 28, 1977 [DE] Fed. Rep. of Germany ....... 2713710

[51] Int. Cl.² .......................................... H03F 1/00
[52] U.S. Cl. ..................................... 330/166; 330/56; 330/199
[58] Field of Search ................ 330/166, 176, 302, 56, 330/199, 297

[56] References Cited

U.S. PATENT DOCUMENTS

| | | | |
|---|---|---|---|
| 2,509,062 | 5/1950 | Horner | 330/166 X |
| 3,221,329 | 11/1965 | Stowell | 330/176 X |
| 3,441,865 | 4/1969 | Siwko | 330/176 X |

*Primary Examiner*—Lawrence J. Dahl
*Attorney, Agent, or Firm*—Hill, Van Santen, Steadman, Chiara & Simpson

[57] ABSTRACT

A remotely powered intermediate amplifier for communications transmission incorporates two sectional amplifiers and a filter circuit interconnecting the output of the first sectional amplifier with the input of the second sectional amplifier.

12 Claims, 7 Drawing Figures

REMOTELY POWERED INTERMEDIATE AMPLIFIER FOR COMMUNICATIONS TRANSMISSION

BACKGROUND

1. Field of the Invention

The present invention relates to communications amplifiers, and more particularly to remotely powered intermediate amplifiers for communications transmission incorporating two conductor coaxial transmission lines.

2. The Prior Art

Intermediate amplifier stations are known for wide-band transmission systems, as for example, carrier-frequency amplifiers, which are remotely powered by DC potential conveyed to the amplifier over the transmission line. When a two conductor transmission line is employed, the transmission line must carry the DC voltage and the AC signals, and so the reference potential of the amplifier cannot be connected directly to the transmission line. When coaxial cables are employed, generally a housing is provided and the outer conductors of the coaxial cables are connected to the housing. Between the amplifier reference potential and the housing a low impedance alternating current connection must be provided, for passing AC signals in the transmission band. This connection is typically produced by means of a blocking capacitor.

The use of a blocking capacitor produces several disadvantages. The capacitor must be capable of blocking relatively high voltages, which causes it to have at least a minimum size, which in turn leads to an inductance which is not negligible at high frequencies. This also leads to parallel resonances at certain frequencies which is extremely undesirable. Moreover, the AC signal in flowing through the capacitor causes a voltage drop across the capacitor, and this voltage produces a current in the input circuit so that a feedback takes place from the output to the input. This feedback produces changes in the frequency response to the amplifier and can lead to instability.

It is therefore desirable that an arrangement be provided whereby the disadvantages of the prior art arrangements can be overcome.

BRIEF DESCRIPTION OF THE INVENTION

In accordance with one embodiment of the present invention, a remotely powered intermediate amplifier is coupled between a coaxial cable input and output, with the outer conductor of the coaxial cables connected together. The intermediate amplifier is composed of two separate sectional amplifiers, each of which has a capacitor connected between a power voltage terminal which is at AC reference potential and the outer conductor of the coaxial cable. The power voltage terminals of both of the sections of the amplifier are uncoupled for high frequencies. The two sectional amplifiers are interconnected by means of a filter circuit, which serves to greatly reduce the disadvantageous effects described above in connection with the prior art.

The intermediate amplifier of the present invention has a large circulation damping with a small signal power damping. The filter which interconnects the sectional amplifiers of the present invention is constructed as a multiple port circuit which has, in addition to the two ports associated with the communications transmission path, at least one further port connected to the outer conductor of the coaxial cable.

By these measures, an intermediate amplifier is produced with especially high circulation damping in which the blocking capacitors of the sectional amplifiers are chosen exclusively according to the requirements of the useful signal transmission, without regard to the desired circulation damping.

These and other objects and advantages of the present invention will become apparent upon an inspection of the following description and the accompanying drawings.

BRIEF DESCRIPTION OF THE DRAWINGS

Reference will now be made to the accompanying drawings in which.

DESCRIPTION OF THE PREFERRED EMBODIMENTS

Figure 1:
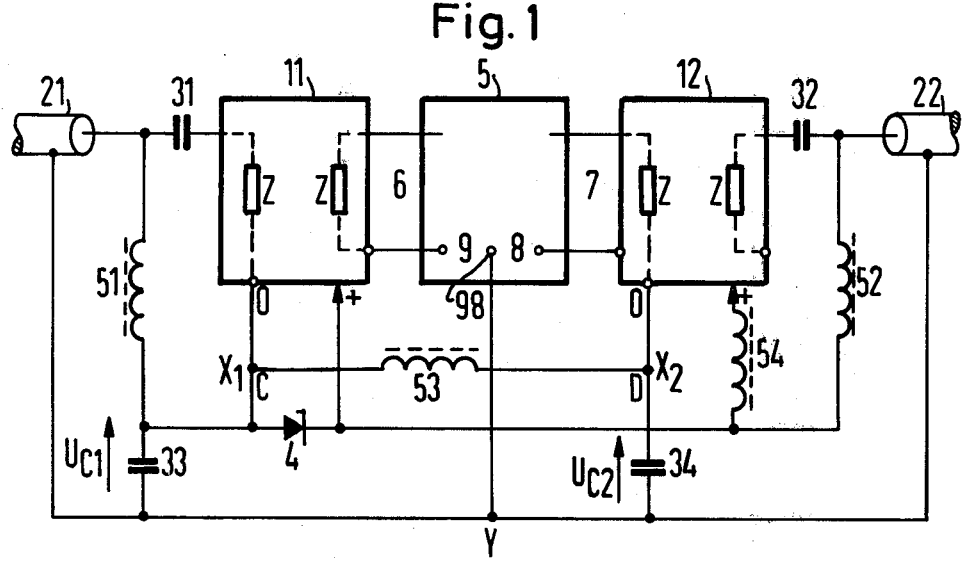
FIG. 1 is a functional block diagram, partly in schematic circuit diagram form, of a preferred embodiment of the present invention.

FIG. 1 illustrates an intermediate amplifier constructed in accordance with the present invention, incorporating two sectional amplifiers 11 and 12. An incoming coaxial cable 21 is connected to the input of the amplifier 11 by a capacitor 31, and the output of the amplifier 12 is connected to the outgoing coaxial cable 22 by a capacitor 32. The amplifier sections 11 and 12 are powered remotely by a DC voltage connected, by the central conductor of the coaxial cables 21 and 22. If more than one intermediate amplifier is employed, they are all powered in a series connection with the voltage source (not shown). The outer conductors of the cables 21 and 22 are connected directly together at the point Y. The inner conductors, which supply the DC power, are connected together through the power input terminals of the sectional amplifiers 11 and 12, which terminals are marked 0 and +.

More specifically, the inner conductor of the cable 21 is connected by a choke 51 to point C, connected to the 0 power input of the sectional amplifier 11. The + power input of the amplifier 11 is connected to the inner conductor of the cable 22 by a choke 52.

Point C is connected by a choke 53 to point D, at the 0 power input of the sectional amplifier 12, and the + input of the amplifier 12 is connected by a choke 54 to the + input of the amplifier 11. Thus, the power inputs of the amplifiers 11 and 12 are both connected in parallel to the voltage source. As the zener diode 4 is connected across the + and 0 terminals of the sectional amplifier 11, it is also, for a DC voltage, connected across the + and 0 terminals of the amplifier 12. The zener diode 4 is not absolutely necessary, and, in fact, is chosen with a zener voltage which is somewhat higher than the voltage drop between the + and 0 inputs of the amplifiers 11 and 12. The zener diode 14 functions as a voltage limiter, to prevent voltages in excess of the zener voltage from being applied to the power inputs of the amplifiers 11 and 12. Alternatively, the zener voltage can be chosen to be equal to the desired voltage drop between the + and 0 power inputs of the amplifiers, in which case, the zener diode serves as a regulator for use with a power source having a finite source impedance.

If desired, the choke 54 may be interconnected between the zener diode 4 and the choke 52. In an alternative embodiment, the + and 0 terminals of the amplifier 12 may be connected directly across the power source, with the corresponding inputs of the amplifier 11 fed by chokes.

The terminal C is connected by a capacitor 33 to the point Y at the outer conductors of the coaxial cables in order to close the input circuit for AC signals. The terminal D of the sectional amplifier 12 is similarly connected by a capacitor 34 to the point Y in order to close the output circuit for AC signals.

The input and output impedances of each of the sectional amplifiers 11 and 12 each have the value Z, and the amplifier 12 produces at its ouput an amplified non-inverted version of the signal applied to the input of the amplifier 11.

Although not specifically represented in FIG. 1, it will be appreciated that there is some capacitive coupling between the power terminals of the sectional amplifiers 11 and 12.

A filter 5 is interconnected between the output of the amplifier 11 and the input of the amplifier 12, and is constructed as a four port circuit. Input and output ports 6 and 7 are connected respectively to amplifiers 11 and 12, and ports 8 and 9 are connected together and serve to connect the AC reference points of the output of the amplifier 11 and the input of the amplifier 12 to a common point 98 which is connected to the outer conductor of the cables 21 and 22.

Figure 2:
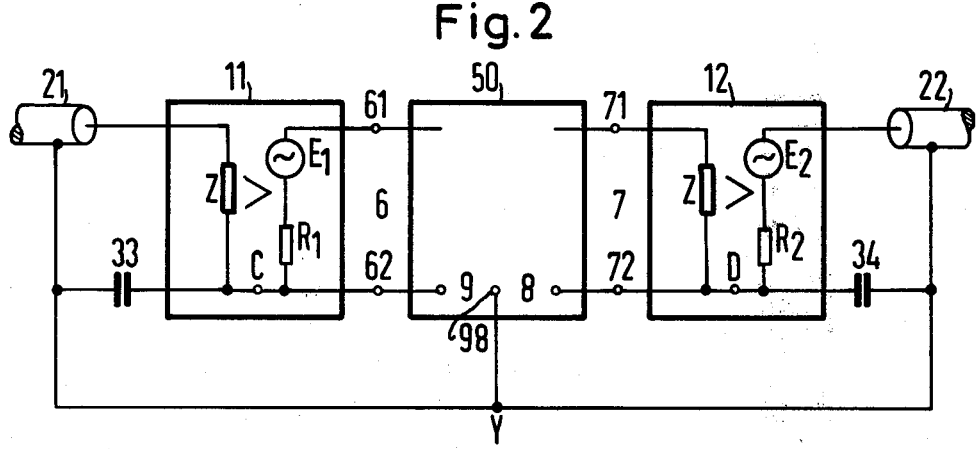
FIG. 2 is an equivalent circuit diagram of the apparatus of FIG. 1 for high frequencies.

Referring now to FIG. 2, an equivalent circuit for AC signals is illustrated. The capacitors 33 and 34 are in the signal path and therefore represent an undesired coupling impedance between the output circuit and the input circuit. The criterion for this coupling is referred to herein as the circulation damping of the branch. The output terminals of the amplifier 11 are 61 and 62, and the input terminals of the amplifier 12 are 71 and 72. The terminals 62 and 72 are at AC reference potential. If these two terminals were directly connected, the output of amplifier 12 would cause a voltage to be developed across the capacitor 34, and also the input capacitor 33, which would represent an undesirable feedback from the output of the amplifier 12 to the input of the amplifier 11. By providing for a high circulation damping, the feedback signal across the capacitor 33 is substantially reduced. This is achieved by the filter circuit 50 of FIG. 2 in which a relatively high attenuation is provided between the ports 8 and 9, and a relatively low attenuation between the ports 6 and 7. The higher the impedance between the terminals 62 and 72, the higher is the circulation damping.

Figure 5:
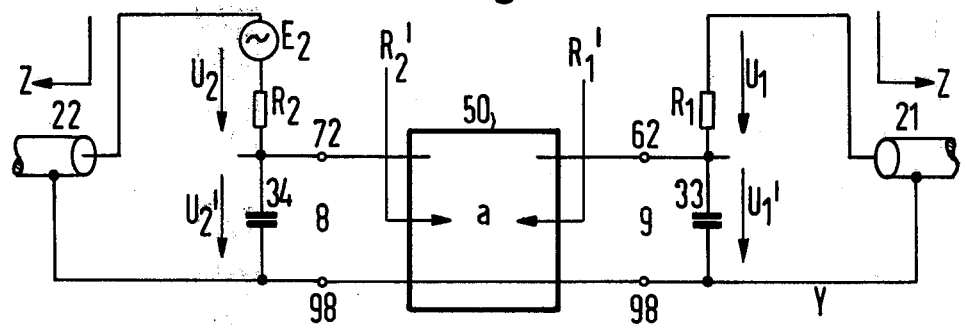
FIG. 5 is an equivalent circuit of a portion of the apparatus of FIG. 1, illustrating principles of design in the circulation damping of the intermediate amplifier.

The determining conditions for the damping of the filter circuit 50 may be realized by inspecting FIGS. 2 and 5, the latter being an equivalent circuit useful in connection with the following discussion of circulation damping. The resistances $R_1$ and $R_2$ represent the output impedances of the amplifiers 11 and 12 respectively, the output signals being represented by voltage sources $E_1$ and $E_2$ respectively.

The determining conditions for the circulation damping $a_u$ of the filter circuit 50 is:

$$e^{a_u} = U_2/U_1$$

where $U_2$ and $U_1$ are the voltage drops across $R_2$ and $R_1$, respectively.

If the voltage damping of the filter member is designated with "a", then, with an operational termination, the following equation is valid:

$$U'_2/U'_1 = e^a$$

where $U'_2$ and $U'_1$ are the voltage across capacitors 34 and 33, respectively.

If the impedance of the parallel circuit consisting of capacitor 34 and resistor $R'_2$ is designated with P, then it follows that:

$$U'_2 = U_2 \frac{P}{Z + P}$$
$$U'_1 = U_1 \frac{R_1 + Z}{R_1}$$
$$\frac{U'_2}{U'_1} = e^a = \frac{U_2}{U_1} \cdot \frac{P \cdot R_1}{(Z + P)(R_1 + Z)}$$
$$K = \frac{P \cdot R_1}{(Z + P)(R_1 + Z)}$$
$$e^a = e^{a_u} \cdot K$$
$$a_u = a - \ln K$$

The last equation establishes a relation required in the filter circuit 50. The capacitive reactance of the capacitor 34 is contained in the factor K, whereas the damping "a" is dependent on the value of the capacitor 33. If the capacitance of the capacitor 34 is permitted to go to infinity, then $-\ln K$ goes to $+$infinity, and the circulation damping also goes to infinity. The same result is achieved if the capacitance of the capacitor 34 is permitted to go to infinity. However, from the last equation it is apparent that even with relatively small capacitors 33 and 34, a large circulation damping $a_u$ can be produced by choosing an appropriate voltage damping "a". It is therefore possible to choose the values of the capacitors 33 and 34 exclusively in accordance with the requirements of the useful signal transmission, and achieve high circulation damping by arranging the filter circuit 50 to produce a large voltage damping "a". In this way, greater transmission band widths can be obtained. For example, when the capacitors 33 and 34 are selected with values such that the self-resonance lies above the useful band limit, an insufficient circulation damping would result were it not for the filter 50. By means of the filter 50, an increase in the circulation damping is produced without effecting the upper frequency limit of the pass band. Moreover, a favorable signal-to-noise ratio is achieved.

Although two sectional amplifiers have been described, it is also within the scope of the present invention to provide N sectional amplifiers, in which case $N-1$ multigate circuits are employed to interconnect the sectional amplifiers. The sectional amplifiers are carefully shielded from each other in order to avoid capacitive couplings between them.

Figure 3:
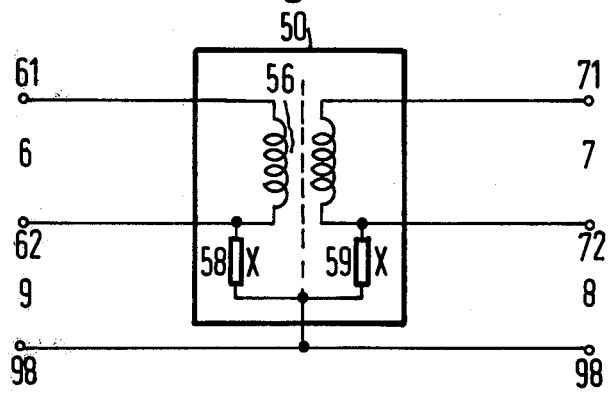
FIG. 3 is an illustration of one filter circuit which may be used in connection with the present invention.

Referring now to FIG. 3, there is shown an illustration of the filter 50 which may be used as the filter 5 in the apparatus of FIG. 1. It contains a transformer 56 with its primary and secondary windings connected to the appropriate terminals of the amplifiers 11 and 12, to form a communications path. The terminals 62 and 98 of the port 9 are connected across an impedance 58, while a similar impedance 59 is connected across the terminals of the port 8. A shield is provided between the windings of the transformer 56, and it is directly connected to the terminal 98. Alternatively, the shield may be connected to the terminal 98 through a series capacitor (not shown), or it may be connected directly to either the terminal 62 or the terminal 72.

Figure 4:
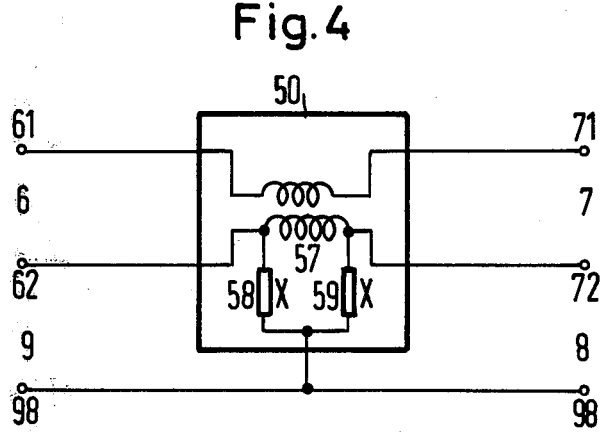
FIG. 4 is an illustration of an alternative filter circuit which may be used with the present invention.
Figure 6:
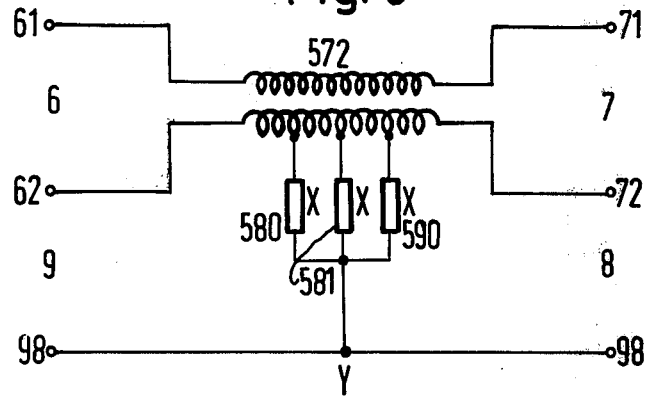
FIG. 6 is an illustration of yet another filter arrangement which may be used in the present invention.
Figure 7:
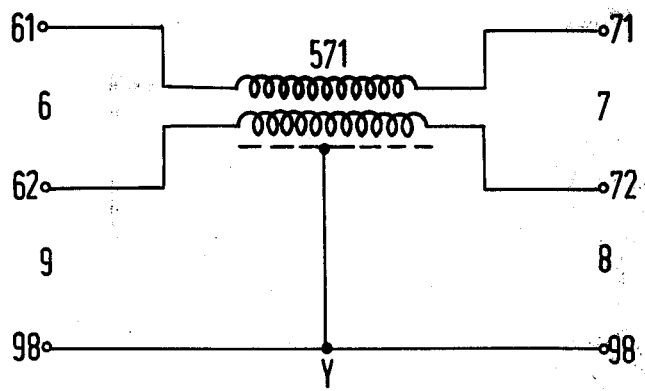
FIG. 7 is an illustration of a further filter circuit which may be used in the present invention.

FIGS. 4, 6 and 7 show alternative filters which may be employed in the present invention. In each case, a transformer 57, 572, and 571 respectively is connected with one winding connected in series between the terminals 61 and 71, and the other winding in series between the terminals 62 and 72. The ports 6 and 7 are thus electrically connected together (as distinct from the magnetic coupling provided by the filter of FIG. 3). When the filter circuits of FIGS. 4, 6 and 7 are employed, the choke 52 of FIG. 1 may be omitted if desired.

In FIG. 4, an impedance 58 is connected between the terminals 62 and 98, and an impedance 59 is connected between the terminals 72 and 98. In FIG. 6, three taps are provided on the transformer winding which interconnects the terminals 62 and 72. These taps are connected to the terminal 98 by means of impedances 580, 581 and 590 respectively. In a modified form, (not shown) a different number of taps may be employed, with each tap being connected by an impedance to the terminal 98. For example, a single tap can be provided with an impedance connection to the terminal 98. In addition, one or both of the ends of the winding, at terminals 62 and 72, may be connected to the terminal 98 by means of an impedance.

The impedances 58, 59, 580, 581 and 590 illustrated in FIGS. 3, 4 and 6 are preferably low inductance capacitors. Taking the self-resonance of the capacitors into consideration, the capacitance of each of the impedances is chosen so that, in the pass band, a maximum circulation damping is produced.

In the filter circuit of FIG. 7, the transformer 571 is provided with a shield which is capacitively coupled with the one transformer winding which interconnects the terminals 62 and 72. This shield is connected directly to the terminal 98. In one arrangement, the transformer 571 is formed from a length of triaxial cable, or a coaxial cable with an additional shield.

By the foregoing, the present invention has been described with sufficient particularity to enable others skilled in the art to make and use the same. It will be apparent, however, that various modifications and additions may be incorporated, without departing from the essential features of novelty thereof, which are intended to be defined and secured by the appending claims.

What is claimed is:

1. In a remotely powered intermediate amplifier for communications transmission having an input terminal, an output terminal and a terminal common to input and output, said terminals being adapted for connection with a transmission line, said amplifier being remotely powered with electrical power over said transmission line, the combination comprising first and second sectional amplifiers, means connecting said input terminal to the input of said first sectional amplifier, means connecting said output terminal to the output of said second sectional amplifier, means for connecting each of said sectional amplifiers to a source of electrical power through said input and output terminals, means for decoupling the electrical power connections of said sectional amplifiers from each other for AC signals, a first capacitor connected between said common terminal and an AC reference potential of said first sectional amplifier, a second capacitor connected between said common terminal and an AC reference potential of said second sectional amplifier, and a filter circuit interconnecting the output of said first sectional amplifier and the input of said second sectional amplifier, said filter circuit having at least three ports, first and second ones of said ports being connected to said first and second sectional amplifiers and at least one further port connected to said common terminal.

2. The intermediate amplifier according to claim 1, wherein said filter circuit is constructed as a four-port circuit, with said third and fourth ports interconnecting said common terminal with said AC reference potential of said sectional amplifiers.

3. The intermediate amplifier according to claim 2, wherein said filter circuit contains a transformer arranged between said first and second ports, one terminal of each of said first and second ports being connected to said AC reference potential.

4. The intermediate amplifier according to claim 3, wherein said transformer has its primary winding connected to the first port and its secondary winding connected to the second port, the terminals of said first and second ports which are connected to said AC reference potential being connected, each by an impedance, to said common terminal.

5. The intermediate amplifier according to claim 3, wherein said transformer contains two windings by which said first and second ports are electrically connected together, one of the two windings being capacitively connected to said common terminal.

6. The intermediate amplifier according to claim 5, including an impedance for connecting one end of said one winding to said common terminal.

7. The intermediate amplifier according to claim 5, including an impedance for connecting a tap of said one winding to said common terminal.

8. The intermediate amplifier according to claim 5, including a shield for said transformer, said shield being coupled capacitively to said one winding, and means connecting said shield to said common terminal.

9. The intermediate amplifier according to claim 4, wherein said transformer is provided with a shield situated between the windings, and a capacitor for connecting said shield to said common terminal.

10. The intermediate amplifier according to claim 6, wherein said impedance is a capacitor.

11. The intermediate amplifier according to claim 7, wherein said impedance is a capacitor.

12. The intermediate amplifier according to claim 8, wherein said shield is connected to said common terminal by a capacitor.

* * * * *